US006038325A

United States Patent [19]

Yoshida et al.

[11] Patent Number: 6,038,325

[45] Date of Patent: Mar. 14, 2000

[54] SPEAKER SYSTEM FOR USE IN AN AUTOMOBILE VEHICLE

[75] Inventors: Minoru Yoshida; Fumio Matsushita; Satoshi Kumada; Yoshiki Ohta, all of Saitama-ken, Japan

[73] Assignee: Pioneer Electronic Corporation, Tokyo, Japan

[21] Appl. No.: 09/015,794

[22] Filed: Jan. 29, 1998

[30] Foreign Application Priority Data

Feb. 6, 1997 [JP] Japan .................................... 9-024079

[51] Int. Cl.[7] ........................................ H04B 1/00

[52] U.S. Cl. ........................................ 381/86; 381/71.4

[58] Field of Search .................................... 381/86, 1, 98, 381/71.4

[56] References Cited

U.S. PATENT DOCUMENTS 4,622,691 11/1986 Tokumo et al. .......................... 381/86

*Primary Examiner*—Ping Lee

*Attorney, Agent, or Firm*—Nikaido, Marmelstein Murray & Oram, LLP

[57] ABSTRACT

A speaker system for use in an automobile vehicle, comprises: a pair of front speakers for converting electric signals fed from a two-channel source into sound signals; a band pass filter for extracting a signal component having a frequency substantially satisfying $\lambda=2L$ when the automobile vehicle has a length L; a phase adjusting circuit for adjusting the phase of an electric signal; and a rear speaker for converting an electric signal fed through the phase adjusting circuit and the band pass filter into a sound signal.

3 Claims, 6 Drawing Sheets

FIG.4 a *PRIOR ART*
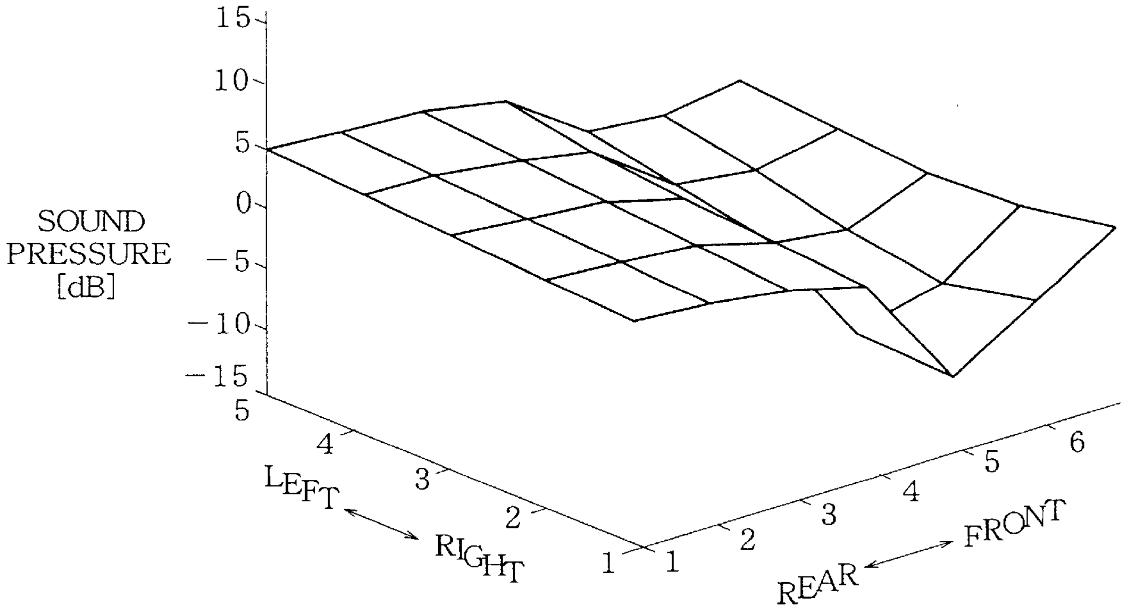
FIG.4 b
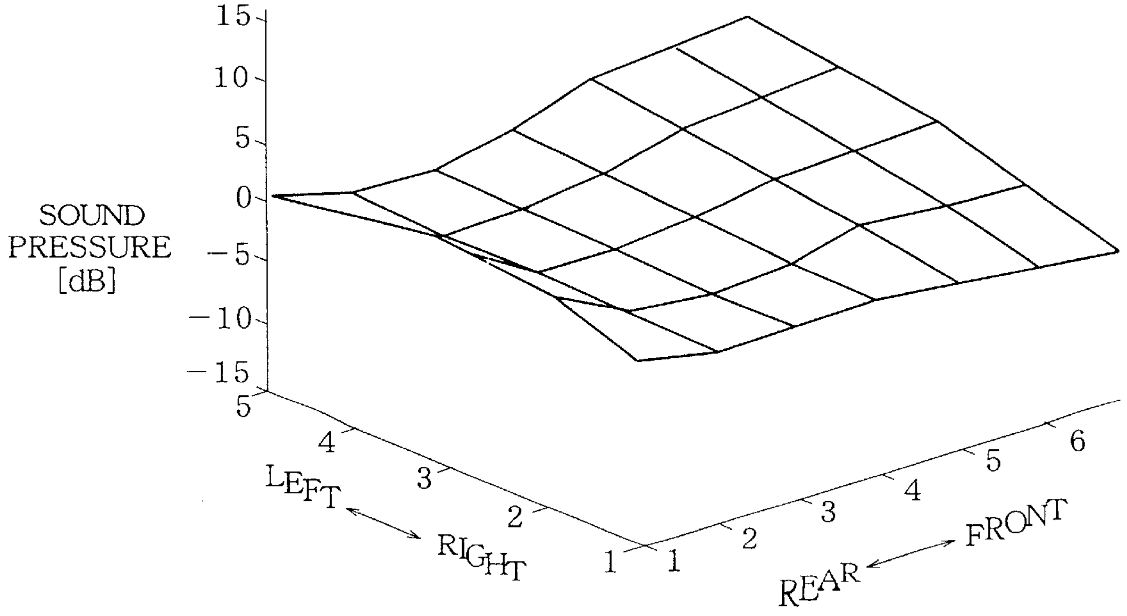

SPEAKER SYSTEM FOR USE IN AN AUTOMOBILE VEHICLE

BACKGROUND OF THE INVENTION

The present invention relates to a speaker system, in particular to a speaker system for use in an automobile vehicle.

It has been known that a speaker system for use in an automobile vehicle is usually a multi-speaker system, such as that shown in FIG. 5.

Referring to FIG. 5, a conventional multi-speaker system comprises a plurality of speakers 4 disposed in a front section, on side doors 2 and on a rear tray 3 within an automobile vehicle 1. With the use of such an arrangement, it is possible for an entire area within the vehicle to obtain a uniform sound pressure, enabling all the persons staying in the vehicle to easily and similarly enjoy music or the like.

However, there is a problem with the conventional multispeaker system illustrated in FIG. 5. Namely, in use of the speaker system, there are primary sounds emitted directly from individual speakers 4 and secondary sounds generated when the primary sounds are reflected from inner walls of the automobile vehicle. Since the primary sounds and the secondary sounds will be unavoidably synthesized together, there is always a fluctuation in the frequency characteristic of the multi-speaker system (due to a reflection synthesizing effect), resulting in a complex peak/dip phenomenon in audible frequency bands.

To alleviate the problem caused by the reflection synthesizing effect, it is necessary to simplify the sound sources involved in a multi-speaker system. Namely, the number of speakers (serving as sound sources) should be made as fewer as possible and these speakers should be arranged in only one direction. Further, to ensure an audio effect similar to a music listening room, it is important to satisfy the following requirements.

(a) A sound image should be located in the front.

(b) A sound image deviation possibly caused due to different seat positions within an automobile vehicle should be eliminated.

(c) A peak/dip phenomenon possibly caused due to the reflection synthesizing effect should be eliminated.

In the multi-speaker system shown in FIG. 5, since the speakers are disposed in every direction, it is difficult to have the sound image located in the front within a vehicle. Therefore, it is understood that the sound image may be located in the front only when the speakers are located in a front section in a vehicle. In other words, if an automobile speaker system is used which includes a pair of speakers disposed only on opposite sides of a front section in a vehicle, it is sure to obtain some improvement in locating the sound image in the front within an automobile vehicle.

Nevertheless, there is another problem with an automobile speaker system including a pair of speakers disposed only on opposite sides of a front section in a vehicle.

Namely, in a limited space within an automobile vehicle, as shown in FIG. 3*a* (which is a graph indicating a relationship between sound pressure and frequency), the sound pressure will reach a peak when the frequency is about 70 Hz. Further, as shown in FIG. 4*a*, the sound pressure will also reach a peak in positions close to rear seats within a vehicle. Since there is such a peak characteristic, sound signals produced by speakers will be somehow unclear in the vicinity of the rear seats.

In fact, FIG. 4*a* indicates sound pressure levels detected in all different positions within a vehicle at a moment a sound signal having a low frequency (such as 70 Hz) is emitted from speakers located in the front section of the vehicle. As shown in FIG. 4*a*, a sound signal having a low frequency is detected to have a uniform sound pressure in a lateral direction across the vehicle, but a sound pressure in the rear section will be higher than that in the front section in the vehicle.

In order to inhibit the occurrence of a peak in sound pressure, there has been suggested an improved speaker system as shown in FIG. 6. Referring to FIG. 6, this speaker system includes a two-channel source 6, a pair of speakers 7,7 connected to the source 6 through two signal lines, a pair of amplifiers 9,9 connected before the two speakers 7,7 on the two signal lines. Further, a pair of filters 8,8 are connected between the two-channel source 6 and amplifiers 9,9 on the two signal lines to attenuate low frequency components.

With the use of the filters 8,8 shown in FIG. 6, it is possible to improve the quality of a sound reaching specific seats (for example, rear seats), but this will undesirably attenuate the level of a low frequency sound signal reaching other seats (for example, front seats). For instance, if a low frequency signal from the above channel source 6 is attenuated to improve the quality of a sound reaching the listeners sitting in the rear seats in the vehicle, the level of a low frequency component of a sound signal reaching the listeners sitting in the front seats will also be unavoidably reduced. This means, the use of the two filters 8,8 will undesirably cause vanishing of a bass feeling for the listeners sitting in the front seats.

As a result, a conventional speaker system shown in FIG. 6 has been proved unable to obtain an improved sound quality throughout the entire internal space of an automobile vehicle.

SUMMARY OF THE INVENTION

It is an object of the present invention to provide an automobile speaker system having an improved sound transmitting characteristic and capable of providing an improved sound quality throughout the whole internal space of an automobile vehicle, so as to solve the above-mentioned problems peculiar to the above-mentioned prior arts.

According to the present invention, there is provided an improved speaker system for use in an automobile vehicle, comprises: a pair of front speakers for converting electric signals fed from a two-channel source into sound signals; a band pass filter for extracting a signal component having a frequency substantially satisfying $\lambda=2L$ when the automobile vehicle has a length L; a phase adjusting circuit for adjusting the phase of an electric signal; and a rear speaker for converting an electric signal fed through the phase adjusting circuit and the band pass filter into a sound signal.

According to one aspect of the present invention, the phase adjusting circuit comprises a delay circuit and a phase inverter which is provided to invert the phase of an electric signal.

According to another aspect of the present invention, the delay circuit is provided to delay an electric signal treated in the phase inverter, for a time period which is set in accordance with a time difference between a necessary time for sound signals from the front speakers to reach predetermined positions and another necessary time for a sound signal from the rear speaker to reach the same positions.

The above objects and features of the present invention will become more understood from the following description with reference to the accompanying drawings.

BRIEF DESCRIPTION OF DRAWINGS

FIG. 4*a* is a graph indicating a distribution of sound pressure within an automobile vehicle when using a speaker system of a prior art.

FIG. 4*b* is a graph indicating a distribution of sound pressure within an automobile vehicle when using a speaker system of the present invention.

DETAILED DESCRIPTION OF THE PREFERRED EMBODIMENTS

Figure 1:
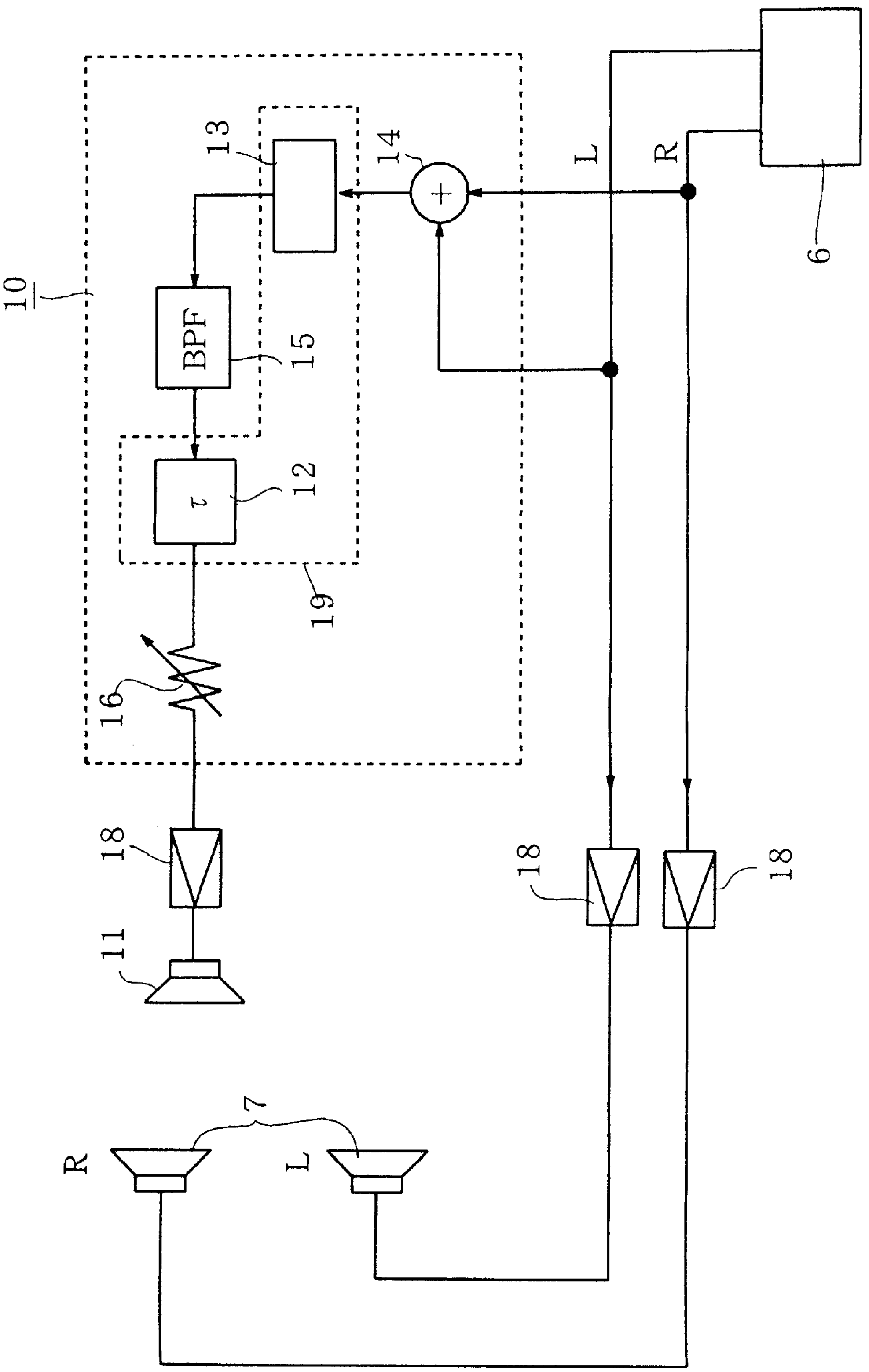
FIG. 1 is a block diagram showing a speaker system according to the present invention.
Figure 2:
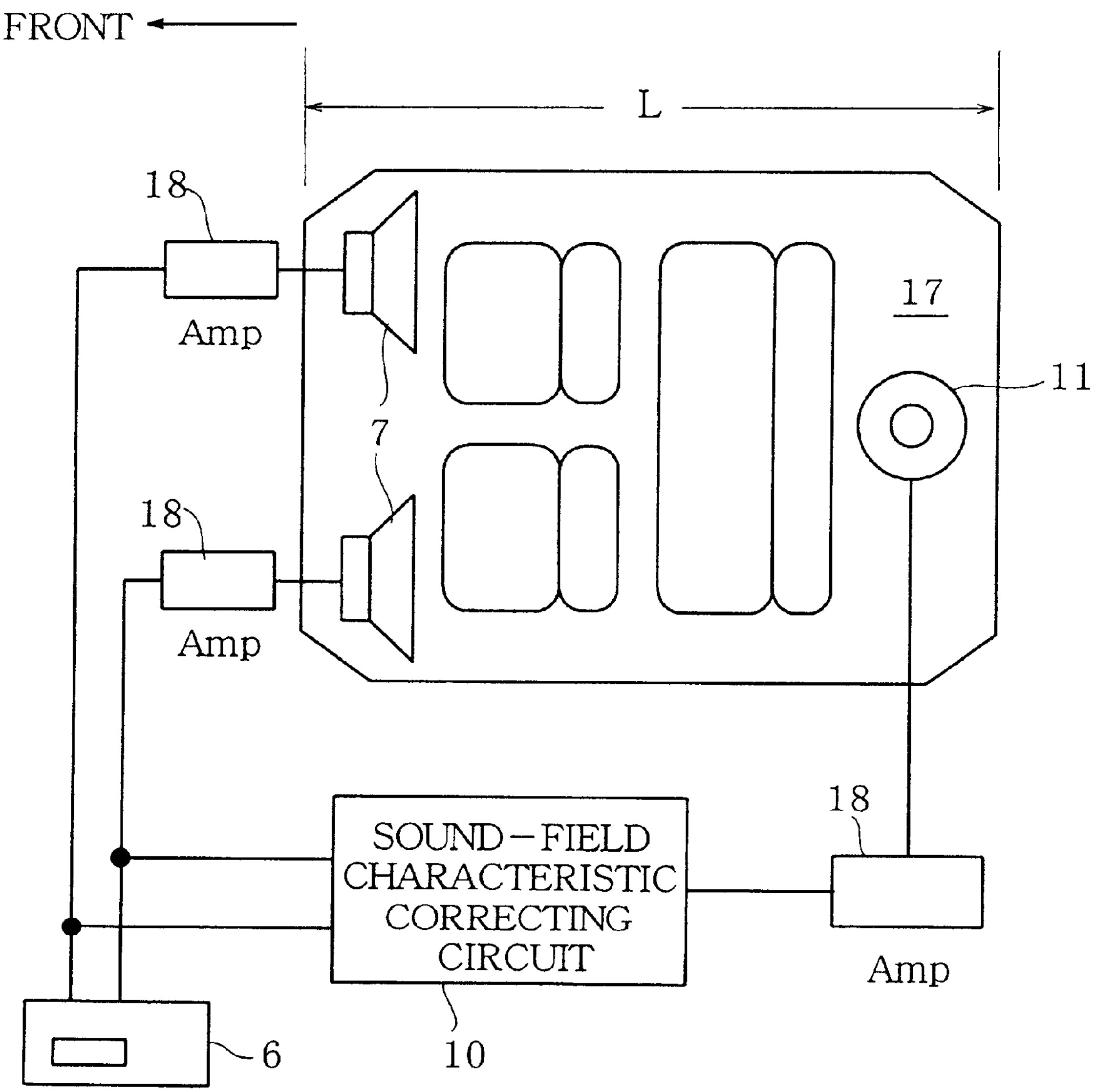
FIG. 2 is a block diagram showing a layout of the speaker system according to the present invention.

Referring to FIGS. 1 and 2, a speaker system according to the present invention, includes a two-channel (left/right channels) source 6, a pair of front speakers 7,7 which are edgeless bass-reflex type speakers capable of converting electric signals from the source 6 into sound signals. The speakers 7,7 are disposed on left and right sides in a front section within a vehicle. Further, the speaker system has a rear speaker 11 disposed in a rear section within the vehicle. The speaker 11 is provided for adjusting a sound characteristic of the speaker system.

As shown in FIG. 1, a sound-field characteristic correcting circuit 10 is provided between the two-source channel 6 and the speaker 11. The sound-field characteristic correcting circuit 10 has an attenuator 16 (serving as an amplitude adjusting means), a phase adjusting circuit 19, an adder 14 for adding together electric signals from left/right channels so as to produce a sum signal, a BPF (Band Pass Field) 15 for extracting a predetermined signal component from the sum signal. In detail, the phase adjusting circuit 19 includes a delay circuit 12 for delaying a signal fed from the BPF 15 and a phase inverter 13 for inverting a sum signal fed from the adder 14 or for phase-shifting a component containing 180-degree angle.

In the present invention, if we assume that an automobile vehicle is equipped with a vehicle room having a length L, thus the BPF 15 should be set to extract a signal component having a frequency substantially satisfying $\lambda=2L$. For example, if a vehicle room has a length of 2.5 m and a sound speed is 340 m/s, a signal component having a frequency substantially satisfying $\lambda=2L$ will be approximately 68 Hz.

Figure 3A:
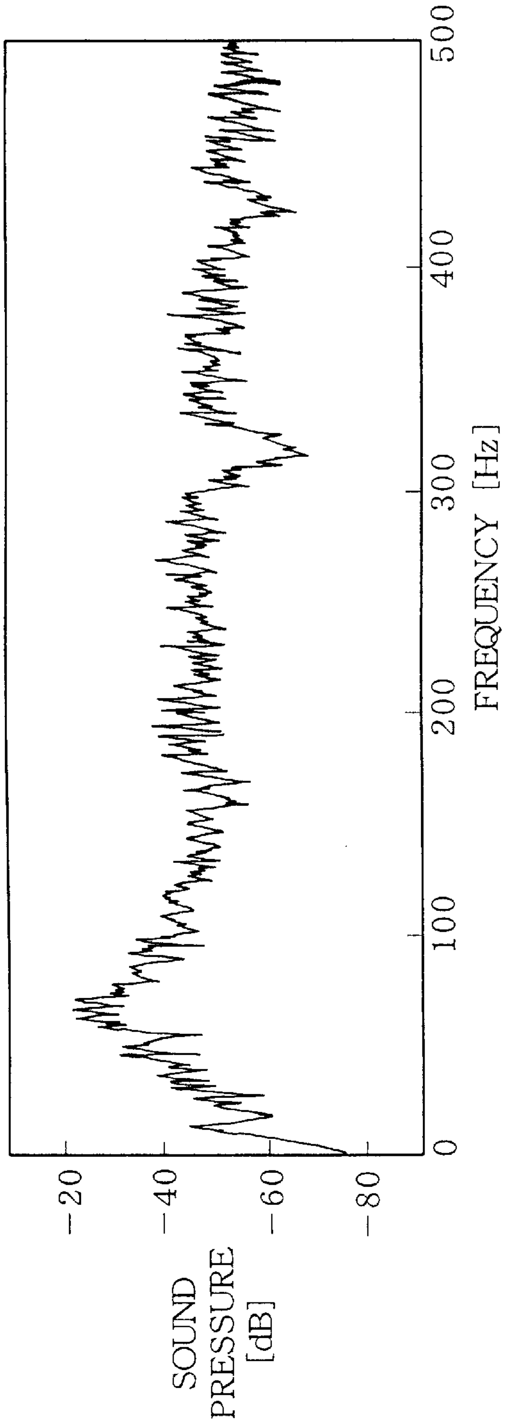
FIG.3 a PRIOR ART
FIG. 3*a* is a graph indicating a relationship between sound pressure and frequency of a speaker system of a prior art.

The reason for a necessity to satisfy $\lambda=2L$ may be explained as follows. Namely, a sound signal having a wave length which is about half of the length of a vehicle room is considered to be a cause of the above peak characteristic (see FIG. 3*a* and FIG. 4*a*). Therefore, if a signal component having a frequency substantially satisfying $\lambda=2L$ is eliminated, it will be sure to inhibit the above peak characteristic.

Referring again to FIGS. 1 and 2, connected to one end of the sound-field characteristic correcting circuit 10 is the rear speaker 11 which is provided to convert an output signal from the circuit 10 into sound signal. The speaker 11 is also an edgeless bass-reflex type speaker usually disposed in the center of a rear section (such as a rear tray 17) within a vehicle.

In FIGS. 1 and 2, each reference numeral 18 is used to represent an amplifier.

The operation of the speaker system of the present invention may be explained in the following.

The electric signals are supplied from the two-channel (left/right channels) source 6 to the front speakers 7,7 through two amplifiers 18,18, so as to be converted into sound signals respectively. Meanwhile, signals from the left/right channels are added together in the adder 14 to form a sum signal which is then inverted (or phase-shifted for 180 degree) in the phase inverter 13. The signal from the phase inverter 13 is applied to the BPF 15 to extract a predetermined signal component which is then delayed in the delay circuit 12 and finally fed to the rear speaker 11 through the attenuator (serving as an amplitude adjusting means) 16 and the amplifier 18. In this way, a predetermined signal component having a frequency substantially satisfying $\lambda=2L$ is converted into sound signal in the rear speaker 11 so as to be emitted therefrom.

The delay circuit 12 is set to provide a time delay such as 4–5 ms which is substantially equal to a time difference between a necessary time for sound signals from the front speakers 7,7 to reach predetermined positions (for example, rear seats) and another necessary time for signal from the rear speaker 11 to reach the same positions. By setting such a time delay, it is possible to effectively improve the peak characteristic of the speaker system with respect to the predetermined positions (for example, rear seats). Further, it is also possible to reduce an influence of the sound signal (for correcting sound-field characteristic) emitted by the rear speaker 11. Thus, with the use of such an arrangement, a signal component (having a peak characteristic shown in FIG. 4*a*) of the sound signal emitted from the front speakers 7,7 may be eliminated by a sound signal emitted from the rear speaker 11.

By the way, if the BPF (Band Pass Filter) 15 is a higher-order digital filter 15 in which a time for signal process can not be ignored if compared with the above time difference, such a time for signal process should be taken into account when setting a time delay for the delay circuit 12. Anyway, a time delay to be set for the delay circuit 12 should be decided in view of: 1) a time difference between a necessary time for sound signals from the front speakers 7,7 to reach predetermined positions and another necessary time for signal from the rear speaker 11 to reach the same positions, 2) a time necessary for processing signals in the sound-field characteristic correcting circuit 10.

Figure 3B:
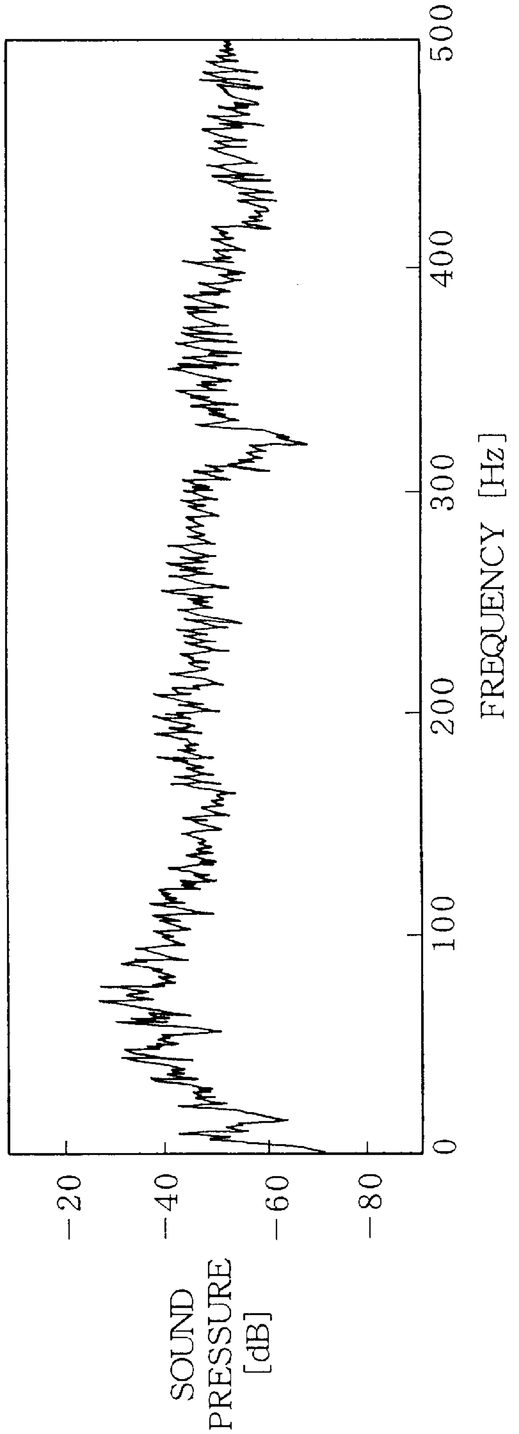
FIG. 3*b* is a graph indicating a relationship between sound pressure and frequency of a speaker system of the present invention.
Figure 5:
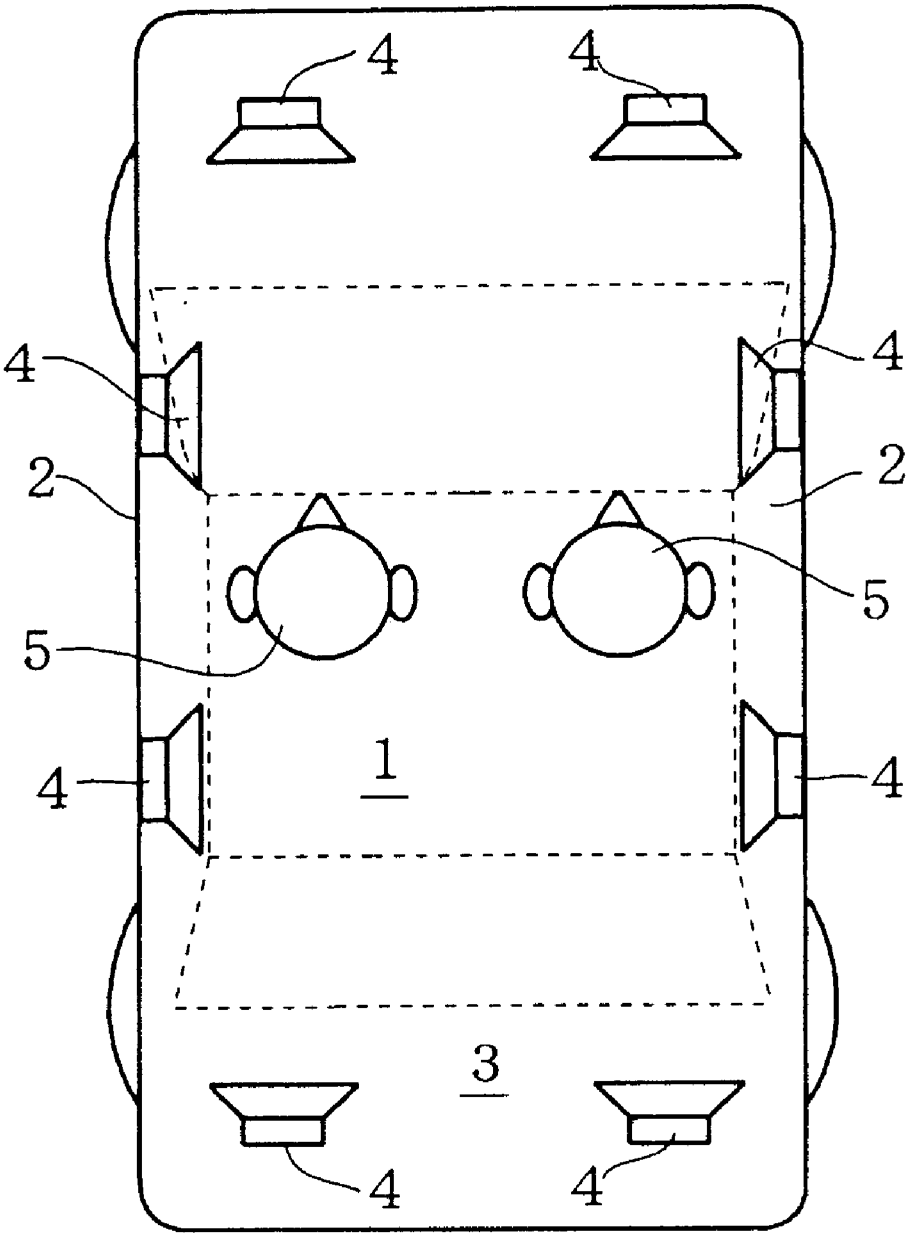
FIG.5 PRIOR ART
FIG. 5 is a plane view showing a conventional multi-speaker system of a prior art.
Figure 6:
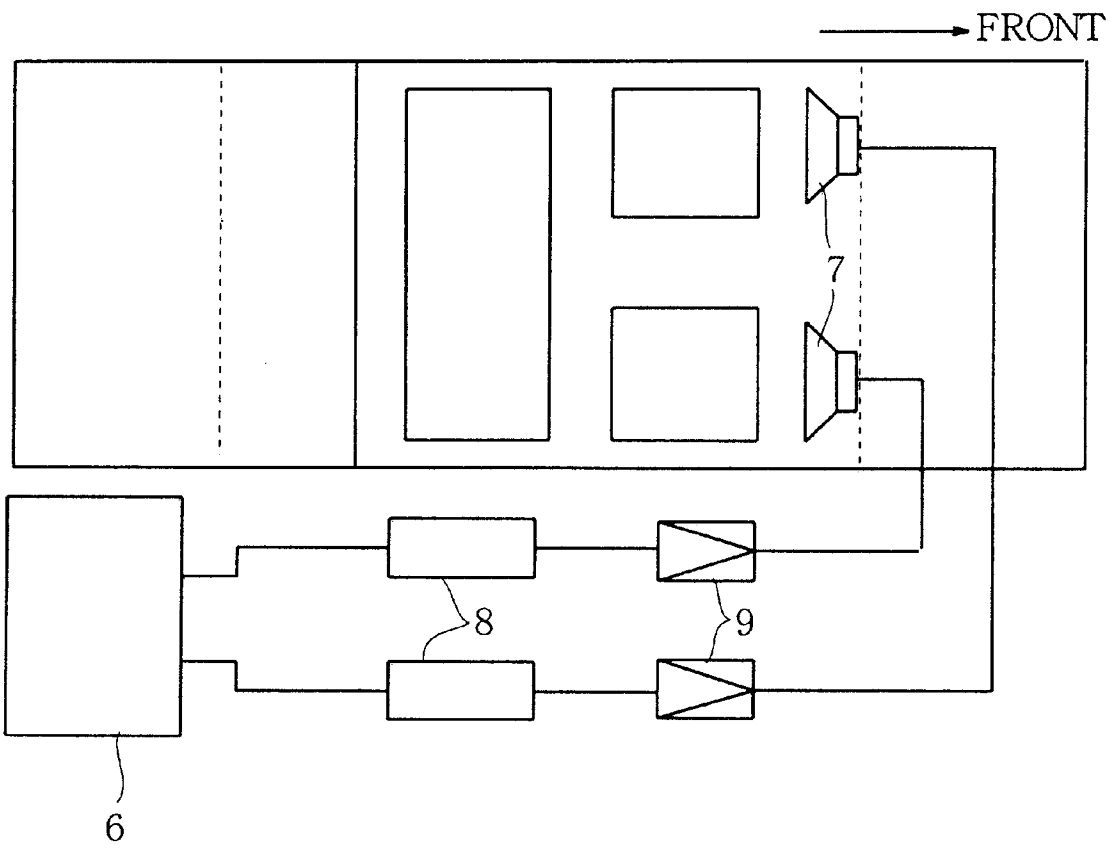
FIG.6 PRIOR ART
FIG. 6 is a block diagram showing a speaker system of a prior art.

As is understood from the above description, with the use of the present invention, a sound signal of a low frequency may be improved in its clarity, making it possible to obtain a sound signal having a balanced feeling and ensuring a further improved sound quality, as shown in FIG. 3*b*. As shown in FIG. 3*b*, in a speaker system of the present invention, a peak in sound pressure of a sound signal having a low frequency (70 Hz) may be inhibited considerably, as compared with a speaker system of a prior art (shown in FIG. 3*a*). Further, as shown in FIG. 4*b*, a sound signal having a low frequency has been detected to have a uniform sound pressure in almost all positions throughout the internal space of the vehicle, thus improving the sound-field characteristic of a speaker system when it is used within an automobile vehicle.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A speaker system for use in an automobile vehicle, said speaker system comprising:

a pair of front speakers for converting electric signals fed from a two-channel source into sound signals;

a band pass filter having an output of an extracted signal component having a frequency substantially satisfying $\lambda=2L$, where the automobile vehicle has a length L, attenuating or eliminating frequencies which do not substantially satisfy $\lambda=2L$;

a phase adjusting circuit for adjusting the phase of an electric signal;

an amplitude adjuster which adjusts the amplitude of the electric signal; and a rear speaker for converting an electric signal fed through the phase adjusting circuit and output from the band pass filter into a sound signal, wherein the sound signal produced from the rear speaker corrects a peak/dip characteristic caused by the front speakers.

2. The speaker system according to claim 1, wherein the phase adjusting circuit comprises a delay circuit and a phase inverter which is provided to invert the phase of an electric signal.

3. The speaker system according to claim 2, wherein the delay circuit is provided to delay an electric signal treated in the phase inverter, for a time period which is set in accordance with a time difference between a necessary time for sound signals from the front speakers to reach predetermined positions and another necessary time for a sound signal from the rear speaker to reach the same positions.

* * * * *